United States Patent
Matsumoto et al.

(10) Patent No.: US 7,534,339 B2
(45) Date of Patent: May 19, 2009

(54) REACTOR FILLED WITH SOLID PARTICLE AND GAS-PHASE CATALYTIC OXIDATION WITH THE REACTOR

(75) Inventors: Yukihiro Matsumoto, Kobe (JP); Takeshi Nishimura, Himeji (JP); Sei Nakahara, Himeji (JP); Naoto Kasaya, Himeji (JP)

(73) Assignee: Nippon Shokubai Co., Ltd, Osaka (JP)

( * ) Notice: Subject to any disclaimer, the term of this patent is extended or adjusted under 35 U.S.C. 154(b) by 208 days.

(21) Appl. No.: 11/498,426

(22) Filed: Aug. 3, 2006

(65) Prior Publication Data

US 2007/0003460 A1   Jan. 4, 2007

Related U.S. Application Data

(62) Division of application No. 10/163,032, filed on Jun. 5, 2002, now abandoned.

(30) Foreign Application Priority Data

Jun. 26, 2001  (JP)  ............... 2001-193137

(51) Int. Cl.
  C10G 51/06   (2006.01)
  C07C 27/10   (2006.01)
  B01J 8/00    (2006.01)
  F28D 7/00    (2006.01)

(52) U.S. Cl. ............... 208/78; 422/312; 422/196; 422/197; 422/198; 422/200; 422/201; 422/105; 422/106; 374/100; 374/137

(58) Field of Classification Search ................ 422/196, 422/201, 312, 197, 198, 200, 105, 106; 208/3, 208/49, 95, 78

See application file for complete search history.

(56) References Cited

U.S. PATENT DOCUMENTS 2,148,706 A * 2/1939 Morrow .................. 374/141
3,656,914 A   4/1972 Friedrichsen et al.

(Continued)

FOREIGN PATENT DOCUMENTS

DE          19717165 A1 * 4/1997

(Continued)

OTHER PUBLICATIONS

First Office Action dated Nov. 23, 2007 from the Patent Office of the People's Republic of China in Japanese Patent Application No. 200510129457.3, Filed: Jun. 26, 2002 for Applicant: Nippon Shokubai Co., Ltd.

(Continued)

Primary Examiner—Walter D Griffin
Assistant Examiner—Huy-Tram Nguyen
(74) Attorney, Agent, or Firm—Porzio, Bromberg & Newman

(57) ABSTRACT

A shell-and tube reactor including at least one reaction tube with a measuring means, substantially same solid particles being filled in the reaction tubes with or without the measuring means, a length of the filled solid particle layer, and a pressure drop thereof while passing a gas through the reaction tube, per each reaction tube, being substantially the same, respectively. By measuring the temperature of the catalyst particle layer, such a temperature as a representative can be gasped.

15 Claims, 3 Drawing Sheets

U.S. PATENT DOCUMENTS

| | | | | | |
|---|---|---|---|---|---|
| 3,736,355 | A | * | 5/1973 | Barton et al. | 562/546 |
| 3,955,419 | A | * | 5/1976 | Barton et al. | 374/166 |
| 4,224,187 | A | * | 9/1980 | Vanderspurt | 502/212 |
| 4,929,798 | A | | 5/1990 | de Lasa | |
| 5,739,391 | A | * | 4/1998 | Ruppel et al. | 562/532 |
| 5,962,607 | A | * | 10/1999 | Yamamoto et al. | 526/88 |
| 6,333,011 | B1 | | 12/2001 | Schliephake et al. | |
| 6,613,940 | B1 | * | 9/2003 | Nishimura et al. | 562/545 |
| 6,657,088 | B2 | * | 12/2003 | Schliephake et al. | 568/476 |

FOREIGN PATENT DOCUMENTS

| | | |
|---|---|---|
| EP | 1 080 780 A1 | 3/2001 |
| JP | 48 22897 | 7/1973 |
| JP | A 10 309457 | 11/1998 |
| JP | 2001 137689 | 5/2001 |
| WO | WO 00/17946 | 3/2000 |

OTHER PUBLICATIONS

First Office Action in Chinese Patent Application No. 200510129457.3 dated Nov. 23, 2007.
Notification of Reason for Refusal in Japanese Patent Application No. 2001-193137 dated Jan. 15, 2008.
Translation of Notification of Reason for Refusal dated Aug. 21, 2007.
Second Office Action in Chinese Patent Application No. 200510129457.3 dated Mar. 7, 2008.

* cited by examiner

Raw material gas

REACTOR FILLED WITH SOLID PARTICLE AND GAS-PHASE CATALYTIC OXIDATION WITH THE REACTOR

CROSS-REFERENCE TO RELATED APPLICATION

This application is a divisional of U.S. patent application Ser. No. 10/163,032 filed Jun. 5, 2002 now abandoned, hereby incorporated in its entirety by reference into this application.

BACKGROUND OF THE INVENTION

1. Field of the Invention

The present invention relates to a shell-and-tube heat exchanger type reactor filled with solid particles, and a method for producing (meth)acrylic acid and/or (meth)acrolein with the reactor.

2. Description of Related Art

Exothermic reactions such as an oxidation reaction in an industrial scale are performed with shell-and-tube reactors filled with catalyst and inert particles. Here, a heat medium exists among the reaction tubes in the shell. Such a reactor is used in the field of chemical industry for example methods for producing phthalic anhydride from o-xylene, acrolein and/or acrylic acid from propylene or propane, and methacrolein and/or methacrylic acid from isobutylene.

Evaluation of conditions of the shell-and tube reactor filled with catalyst particles has shown the selectivity and conversion of the prescribed products is affected remarkably by the temperature along with the reaction tubes. This temperature profile along with the axis is measured with thermometers. The thermometer is inserted into the reaction tube in the case of fixing the thermometer itself at a prescribed point, on the other hand, a protective tube for the thermometer is usually in advance inserted into the reaction tube and then the thermometer is inserted into the protective tube in the case of measuring the temperature profile while moving the thermometer along with the axis.

However, such a thermometer has a drawback that the thermometer occupies a certain volume in the reaction tube, hence a pressure profile along the axis is generally affected, and accordingly behavior for the pressure drop of the reaction tube in which the thermometer is placed is allowed to change. In the meantime, it is important for temperature measurement to be conducted at a representative reaction tube or more. The reaction process in the reaction tube with thermometers is required to coincide with the reaction process of the reaction tubes without thermometers.

JP-A-10-309457 describes, in order to fulfill such a problem and requirement, a shell-and tube reactor includes at least two same reaction tubes filled with solid particles and at least one reaction tube has a thermometer wherein both the ratio of the solid particle weight to free cross sectional area, per each reaction tube, and the pressure drops measured by means of an inert gas which is laterally introduced in proportion to the free cross section are coincidental, respectively, in the whole reaction tube.

In accordance with the above reactor, when the reaction tubes are filled in such a way that the ratio of the solid particle weight to the free sectional area and the pressure drop at the supplying a gas to the filled layer are identical, respectively, the temperature can be accurately measured even in the reaction tube in which the thermometer is inserted.

However, several kinds of solid particles with different particle sizes are necessary so as to fill the reaction tubes with smaller particles than the solid particles filled, for controlling the pressure drop.

Though sequential changes of pressure drops at solid particle layers in operations is very valuable for obtaining the conditions of solid particles, the same problem as the thermometer is found in the case of setting pressure measuring devices into the reaction tubes.

SUMMARY OF THE INVENTION

An object of the present invention is to provide a shell-and-tube reactor with reaction tubes equipped with or without a thermometer and/or a pressure measuring device (hereinafter it is simply referred to as "measuring means"), which are capable of accurately grasping the temperature and pressure of the solid particle layer for the whole reaction tube by means of measuring the temperature and pressure of the solid particle layer in the reaction tube in which the measuring means is equipped, and a method for producing (meth)acrylic acid and/or (meth)acrolein with the above shell-and-tube reactor.

In view of the above problems, we have diligently investigated shell-and-tube reactors wherein a measuring means is equipped in at least one reaction tube, and a method for producing (meth)acrylic acid and/or (meth)acrolein with the above shell-and-tube reactor. As a result, we have found that temperature or pressure measurement can be performed in at least one reaction tube as the representative for the whole reaction tube by preparing substantially the same solid particles for reaction tubes with or without measuring means, changing the filling time for the reaction tubes with or without the measuring means in such a way that the filled length of the solid particles in each reaction tube is coincidental, and controlling the pressure drop of the solid particle layer in supplying the gas in each reaction tube to be substantially coincidental. The present invention has been achieved.

The present invention relates to a shell-and-tube reactor having a measuring means equipped in at least one reaction tube, in which substantially the same solid particles are filled in the reaction tubes with or without the measuring means, the solid particle layer length in each reaction tube and pressure drop of the solid particle layer in supplying a gas are substantially coincidental, respectively.

Further, the present invention relates to a method for producing (meth)acrylic acid and/or (meth)acrolein with the above shell-and-tube reactor.

In accordance with the present reactor, it can measure the temperature and pressure drop of the solid particle layer accurately.

In accordance with the present reactor, it does not need smaller solid particles for controlling the pressure drop so as to cut the filling time.

In accordance with the present method, high conversion and selectivity to the objective products can be attained.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings:

FIG. 3 is a summarized figure wherein swing-preventing means are equipped with the thermometers; FIG. 4 is a front view wherein a wire is used as the swing-preventing means, and the protective tube's tip has a slit shape.

DETAILED DESCRIPTION OF THE PREFERRED EMBODIMENTS

Figure 1:
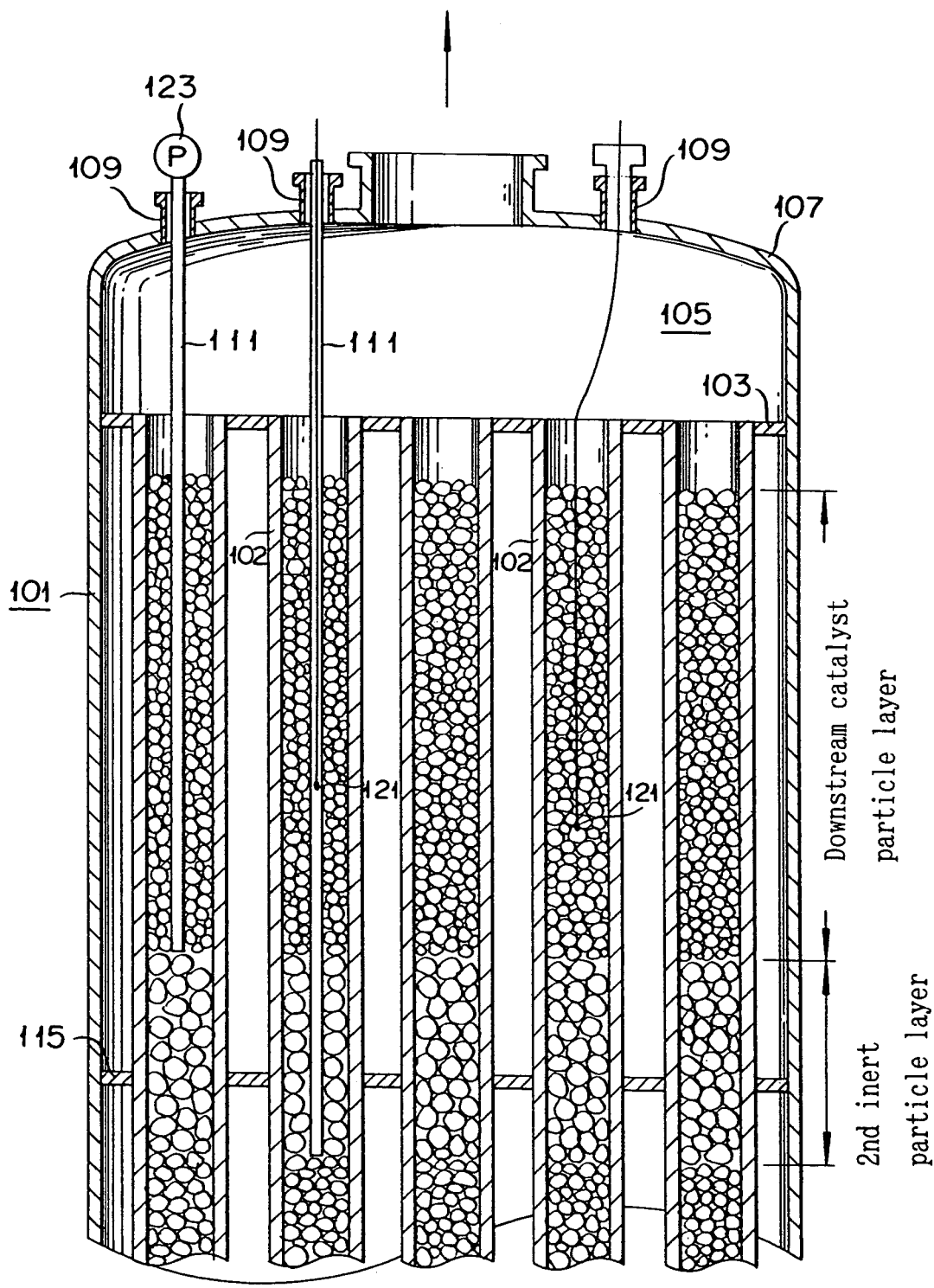
FIG. 1 is a summarized partial cross section of the shell-and-tube reactor of the present invention having the reaction tubes equipped with movable or fixed thermometers, respectively, inserted through the top of the reactor.

Now, a preferred embodiment of the present invention will be explained using a thermometer as the measuring means. This manner is also performed using a pressure measuring device or pressure gage. The present invention is not restricted to the thermometer.

The shell-and-tube reactor of the present invention is characterized in that a thermometer is provided in at least one reaction tube, substantially the same solid particles are filled in the reaction tubes with or without the thermometer, the length of solid particle layers in each reaction tube and the pressure drop of solid particle layers supplying a gas such as air are substantially coincidental, respectively. The reaction process in the reaction tube with the thermometer can be equal to the reaction process in the reaction tube without the thermometer, so that the temperature can be measured for catalyst particle layers as the representative reaction tube equipped with the thermometer or more. In this method, no smaller particles are mixed, and thus the filling time can be reduced. Furthermore, all reaction tubes can be equal regarding the inside diameter of reaction tubes.

Suitable shell-and-tube reactors may include conventional reactors in that solid particles such as catalyst or inert or inactive particles can be filled into the reaction tubes, but for example include a single-reactor, and tandem. In the reactor, raw material gases are passed through each reaction tube filled with solid particles, on the other hand a heat-medium (shell side fluid) flows through the gap among the reaction tubes so as to remove heat from or supply to the reaction tubes.

In the present shell-and-tube reactor, the shell may be divided with a tube sheet into a plurality, for example two, of chambers. In each chamber, a heat medium may be independently circulated. In the top and bottom chambers, a first reaction is performed in one, and sequentially a second reaction is performed in the other. In this case, in the reaction tubes are filled with first catalyst particles corresponding to the first reaction and the second catalyst particles corresponding to the second reaction. The present reactor is advantageous in that the heat medium of different kinds of type, temperature, and flow rate per a chamber can be circulated, and thus different kinds of reaction per a chamber can be controlled.

The installation manner of reaction tubes to the shell-and-tube reactor is not restricted, but appropriately determined depending upon the number, arrangement, length, diameter of reaction tubes, the design of inlet or outlet area between reaction mediums (it may be referred to as "tube side fluid".) and heat mediums (it may be referred to as "shell side fluid".), volume of the heat medium to be circulated, and the flow-direction of the heat medium (for example parallel or counter flow against the flow direction of the reaction medium).

The inside diameter of reaction tubes with the thermometer (hereinafter it may be referred to as "measuring reaction tube".) may be, or not, the same as the inside diameter of reaction tubes without thermometers (hereinafter it may be referred to as "non-measuring reaction tube".). It is preferred to be the same in view of that the conventional reactor including reaction tubes can be used, it prevents the inside diameter of measuring reaction tubes from becoming large, it prevents the reactor from becoming large, and it prevents an increase in costs.

The number of the reaction tubes is generally in the range of 3,000 to 30,000 pieces, the inside diameter thereof generally in the range of 15 to 50 mm, and the length thereof generally in the range of 2,000 to 10,000 mm in an industrial scale. A measuring reaction tube is at least one among them, but the ratio thereof preferably in the range of 0.05 to 2%, and most preferably in the range of 0.1 to 1%, based on the total number in the reactor. Measuring reaction tubes are preferably uniformly arranged in the shell so as to accurately grasp the temperature profile of the whole reaction tube.

Substantially the same solid particles are filled into the measuring and non-measuring reaction tubes. This is because the length and pressure drop of the solid particle layer in supplying the gas are set to be substantially the same, respectively, by changing the filling speed or filling time of solid particles into the measuring or non-measuring reaction tubes. To use substantially the same solid particles are very advantageous in view of omitting times and equipment for producing several types and kinds of solid particles for controlling pressure drop and mixing these particles uniformly.

The term "substantially the same", which is used for the solid particles, in the present invention means solid particles belonging to the same quality standard. As the quality standard, for example appearance, composition, particle size, true specific gravity, bulk specific gravity, and strength after falling are cited. In the case of mixing plurality of solid particles, the respective is within ±20% based on the set-point in weight.

In the present invention, the filling substantially the same solid particles into the measuring and non-measuring reaction tubes may be that for example, as set forth below, the reaction tube is divided into three blocks, A, B and C, in axial direction, and then three types of substantially the same solid particles A, B and C are filled per each block. More than two types, particle size or shape, of solid particles may be used unless it regulate pressure drop.

Suitable solid particles usually include catalyst particles made of catalyst materials as well as inert particles made of inert materials, which do not react with the raw materials and products. Here, the catalyst particle generally include non-deposited type catalysts or catalysts wherein a carrier is covered with catalyst components, and preferably two or more catalyst particles and a combination of the inert particle and catalyst particle. Here, the combination means a combination of one or more of the inert particles and one or more of the catalyst particles.

The combination of solid particles depends upon reaction. The reaction in the shell-and-tube reactor is not restricted, but includes the conventional reactions of exothermal and endothermal reactions. Concretely, an oxidation reaction, a dehydrogenation, a hydrogenation, an oxidative dehydrogenation are cited. The oxidation reaction is particularly cited such as phthalic anhydride from o-xylene, acrolein from propylene, acrylic acid from propylene and/or acrolein, and methacrylic acid from methacrolein. This oxidation reaction is a heterogeneous catalyst reaction, which is performed in the presence of catalyst particles as the solid particle. The reaction performed in the shell-and-tube reactor of the present invention is thus suitable for gas-phase catalytic oxidation reaction.

Shapes of the catalyst particles are not restricted, but include for example sphere, column, cylindrical, Raschig ring and ring, and preferably cylindrical or Raschig ring in view of increasing the catalyst activity area per unit volume thereof.

The size of catalyst particles is not directly defined since it depends upon the retention time of reaction gases, pressure drop, the inside diameters of non-measuring and measuring reaction tubes, the structure and shape of catalyst particles, but for example in the range of 1 to 20 mm, preferably in the range of 2 to 15 mm, and most preferably in the range of 3 to 10 mm. If the size is less than 1 mm, a consecutive reaction increases, thus the yield of objective products is apt to decrease, and the pressure drop will increase. Adversely, if the size is more than 20 mm, the yield of objective products is apt to decrease since the contact efficiency of the catalyst particles and reaction gases drops. Here, the size of catalyst particles means diameter in the case of for example sphere and column, outer diameter in the case of ring, and a mean of the major axis and minor axis in the case of ellipses.

As the molding method of the catalyst particle, it may be appropriately molded depending upon the structure or shape of the catalyst particles, but for example cited deposition, extrusion and tablet making. In addition, the deposition of refractory inorganic carriers with suitable catalyst materials may be cited.

As the inert particle or inert refractory substance, it may be cited particles inert for raw material gases and products.

As the shape of inert particles, it may be cited for example sphere, column, cylindrical, wire netting, plate type shape. Also goods on the market may be cited such as Raschig ring, interlock saddle, bell saddle, ceramic ball, macmahorn, and Dickson. Suitable examples of the inert refractory substance may include α-alumina, alundum, mullite, carborundum, stainless steel, silicon carbide, steatite, earthenware, porcelain, iron, and various sorts of ceramics.

The size of the inert particles is not directly defined since it depends upon the cooling efficiency of reaction gases including polymerizable materials in a high temperature by means of the inert particles, the inside diameter of reaction tubes, and the structure of shape of inert particles, but usually in the range of 1 to 20 mm, preferably in the range of 2 to 16 mm, and most preferably in the range of 3 to 12 mm. If the size is less than 1 mm, solid materials and sublimate in the gas are apt to close the tubing, and the pressure drop increases. Adversely, if the size exceeds 20 mm, heat-efficiency lowers not to achieve cooling or heating. Here, the size of inert particles means diameter in the case of for example sphere and column, outer diameter in the case of ring, and a mean of the major axis and minor axis in the case of ellipses.

By the term "substantially the same" regarding the length of solid particle layers per each reaction tube, is meant within ±10%, and preferably within ±4%, based on the mean length of the solid particle layers.

By the term "substantially the same" regarding pressure drop of solid particle layers in supplying the gas into the reaction tube, is meant within ±10%, and preferably within ±4%, based on the mean pressure drop of solid particle layers. In the case of sequentially filling plurality of solid particles into the reaction tubes in layers, the length and pressure drop are set to be substantially the same, respectively, per corresponding filled layers.

Solid particles are filled into the reaction tubes as follows (Steps 1 to 7):

Step 1: Solid particles are divided per each reaction tube based on volume. The divided solid particles are filled into the respective non-measuring reaction tube in the range of 15 to 100 sec. per one liter of the divided solid particles. The filling is usually performed by means of a filling machine not to be dispersed on the filling speed per each reaction tube.

Step 2: The length and the pressure drop of filled layers are measured.

Step 3: The value of the length should be within ±10%, preferably ±4%, based on the mean value thereof. If at least one of the values is beyond the above range, all of the filled solid particles are withdrawn from the reaction tubes, and re-filling is performed if necessary by changing the filling speed. The length is measured with a measure or the like.

Step 4: The value of the pressure loss should be within ±10%, preferably ±4%, based on the mean value thereof. If at least one of the values is beyond the above range, all of the filled solid particles are withdrawn from the reaction tubes, and re-filling is performed if necessary by changing the filling speed. The pressure drop is measured at an inlet or outlet by a pressure measuring device while supplying a prescribed amount of gases such as air.

Step 5: A thermometer is set at a prescribed point per each measuring reaction tube. The prescribed point means the point at which the detection part of thermometers is set in the reaction tube in the case of a fixing thermometer, and the points at which the tip of a protective tube for thermometers exists in the reaction tube and at which the detection part of thermometers is set in the reaction tube in the case of a movable thermometer.

Step 6: The divided solid particles are filled slowly into measuring reaction tubes per each reaction tube to roughly the same point, preferably to the same point, of the mean value of filled layers for the non-measuring reaction tubes (at the point wherein the mean value within ±10%, preferably the mean value within ±4%). In this case, the filling per liter of the solid particles is performed for a period of time 1.0 to 50 times, preferably 1.5 to 40 times, especially 2 to 30 times, compared to the filling time of the non-measuring reaction tubes. The solid particles may be manually filled usually or by a filling machine, which speeds can be changeable, though several kinds of thermometers are inserted into the reaction tubes.

Step 7: The value of the pressure drop should be set within ±10%, preferably ±4%, based on the mean value of pressure drops of the non-measuring reaction tubes. If at least one of the values is beyond the above range, all of the filled solid particles are withdrawn from the reaction tubes, and re-filling is performed if necessary by changing the filling speed.

The thermometer to be used in the measuring reaction tubes is not restricted, but includes the conventional thermometers such as thermocouple and resistance thermometers.

Now, setting methods of two representative thermometers will be explained with referring to the drawings.

Figure 2:
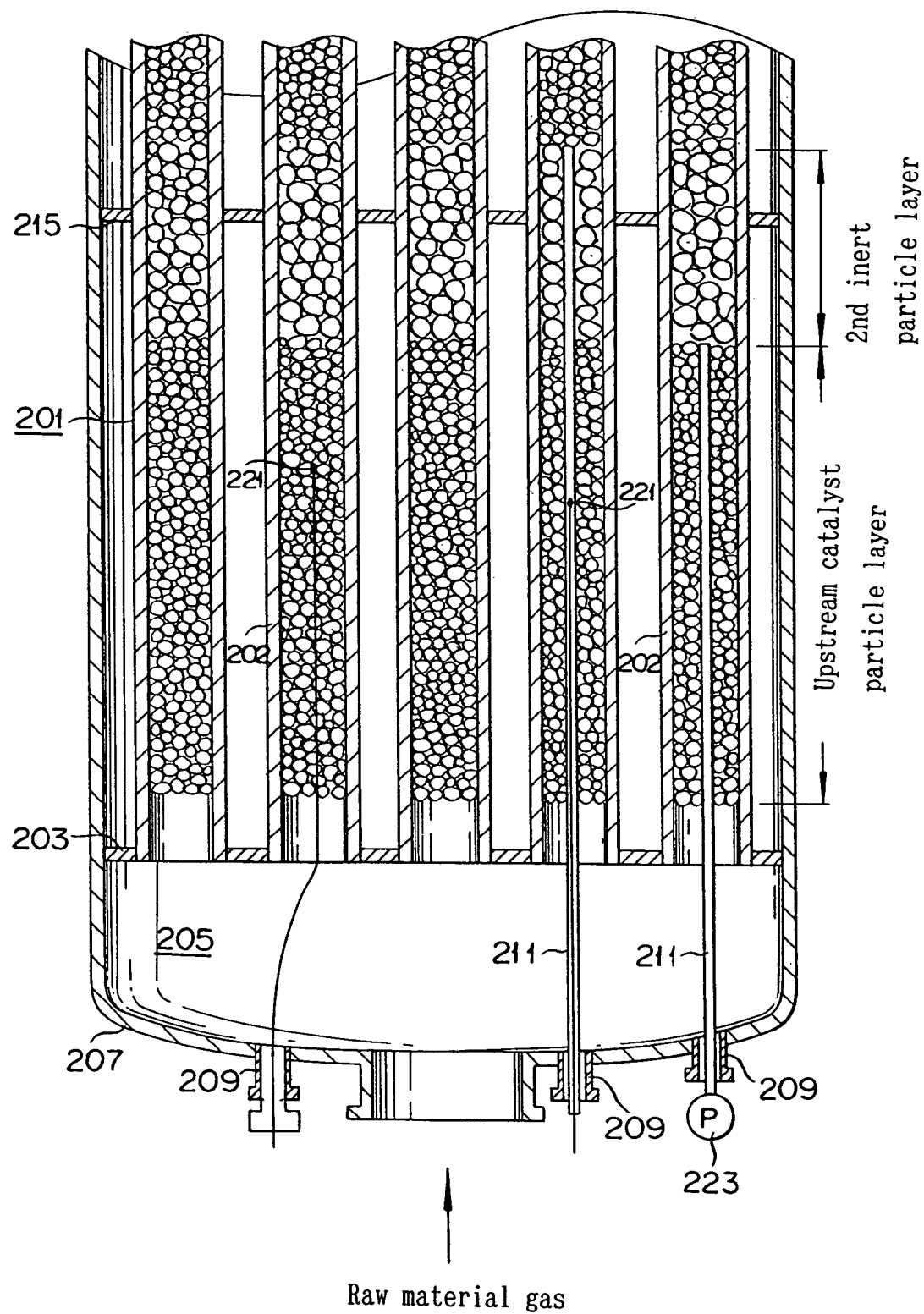
FIG. 2 is a summarized partial cross section of the shell-and-tube reactor of the present invention having the reaction tubes equipped with movable A-A and fixed thermometers, respectively, inserted through the bottom of the reactor.

A first type is a movable thermometer, the detector of which can be freely movable along with the axis of the reaction tube (see FIGS. 1 and 2).

A second type is a fixing thermometer, the detector of which is fixed at a certain point in the reaction tube (see FIGS. 1 and 2). The detector may be one, but pluralities of detectors may be set at different axial points in the reaction tube so as to gain information of a temperature profile along with the reaction tube axis.

Protective means such as a protective tube and a cover for protection may be set in the reaction tubes in any of two types of thermometers so as to prevent the thermometer from friction and shock by means of function of the thermometer in the reaction tube and the solid particles in the case of filling of the solid particles, and routine or special removing and packing thereof.

The outer diameter of thermometers including a protective tube is as small as possible not to affect the reaction, but for example not less than 10 mm, preferably not less than 6 mm. If the diameter exceeds 10 mm, it becomes difficult for the pressure drop of the measuring reaction tube to coincide with that of the non-measuring reaction tube. The inside diameter of the reaction tubes is usually in the range of 15 to 50 mm so as to improve the heat efficiency of the catalyst layer and heat medium. If the outer diameter of thermometers grows large, the gap between the reaction tube and thermometer reduces, thereby the condition of the filled solid particles changes.

FIG. 1 is a partially sectional view of a shell-and-tube reactor of the present invention illustrating that movable and fixing thermometers are set in the reaction tubes, respectively, which thermometers are led from the top of the reactor. FIG. 2 is a partially sectional view of a shell-and-tube reactor of the present invention illustrating that movable and fixing thermometers are set in the reaction tubes, respectively, which temperatures are led from the bottom of the reactor.

In the case of measuring temperatures at upper places of the intermediate tube sheet 115, a protective tube 111 is introduced from the top of the reactor 101 (FIG. 1). Adversely, in measuring temperatures at lower places of the intermediate tube sheet 215, a protective tube 211 is introduced from the bottom of the reactor 201 (FIG. 2). They insert preferably nearby the intermediate tube sheet 115, 215, respectively, not to adverse affect the filling by means of introduction of the protective tube.

As shown in FIGS. 1 and 2, such protective tubes 111, 211 are passed through nozzles for measuring temperatures equipped with an upper shell head 107 or a lower shell head 207 of a shell-and-tube reactor 101, 201; partition rooms 105, 205; and inserted into reaction tubes 102, 202 fixed to the upper fixing tube sheet 103 or the lower fixing tube sheet 203, respectively. They are inserted nearby the intermediate tube sheets 115, 215, respectively. The protective tubes 111, 211 may pass through the opposite shell head, or one tips of the protective tubes are stopped at far tube sheets, closed, and set at prescribed points, respectively.

The movable thermometers 121, 221 are inserted, for example as shown in FIGS. 1 and 2, through nozzles 109, 209 into measuring reaction tubes 102, 202, preferably protective tubes 111, 211 to the intermediate tube sheets 115, 215. The thermometers 121, 221 are universally movable along with the axial directions of the reaction tubes 102, 202.

One or more wiring materials of the fixing thermometers are gathered and fixed at the nozzle. Further, a switch lid at which the wiring materials are got on and off freely and with a sealing structure may be adopted to the nozzles so as to prevent the air outside from invading into the partition room. This can be also applied to the movable thermometer.

Further, a swing-preventing means is installed preferably in the movable reaction tube, for preventing the horizontal swing or deflection of the thermometer, in particular the detector thereof, against the axis of the reaction tube or protective tube, or the warp thereof. The thermometer is desired to be positioned at the center of the vertical reaction or protective tube in both stationary and moving states by means of the swing-preventing means so as to exclude the adverse effects of the temperature profile to the horizontal direction of the reaction tube.

This means may be applied to the protective tube, i.e., such a means is equipped outside of the protective tube.

As the swing-preventing means, it may be cited a structure that being simple, does not give adverse effects to filling of the solid particles, and small not to reduce the space of reaction tubes too large, but concretely the conventional one.

FIG. 3 are views showing swing-preventing means attached to the thermometers; FIG. 3A is a front view of a wire as the swing-preventing means, FIG. 3D is a side view of the wire; FIG. 3B is a front view of a plate material slight less than the inside diameter of the reaction or protective tube, FIG. 3E is a side view of the plate material; FIG. 3C is a front view of a cross plate material slight less than the inside diameter of the reaction or protective tube, and FIG. 3F is a side view of the cross plate material.

As shown in FIG. 3, it is cited the plate material 325 (FIGS. 3B and 3E) and the cross plate material 327 (FIGS. 3C and 3F), which are slight less than the inside diameter of the reaction or protective tube, as well as the wire, being about the same length as or less than the inside diameter of the reaction tube and vertically attached to the reaction tube at an appropriate intervals of the axial direction (FIGS. 3A and 3C), and plural of needle projections attached to the cover of wiring material of the thermometer. One through 4 pieces of wires or plate materials are preferably attached to the thermometer vertically against the axis in the case of attaching the swing-preventing means to the wire material of the thermometer. More swing-preventing means at one place may be attached unless they do not disturb the filling of the solid particles. The swing-preventing means may be a structure of being easy to put on and take off from the thermometer if necessary, movable in the axial directions of the thermometer, and evolvable around the axis thereof.

Figure 3A:
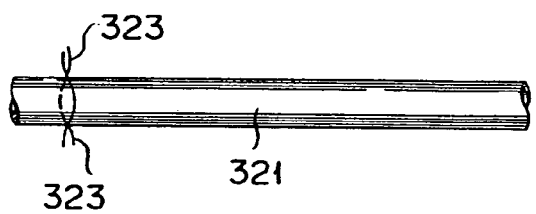
FIG. 3A is a front view.
Figure 3D:
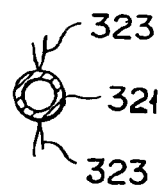
FIG. 3D is a side view, wherein a wire is used as the swing-preventing means, respectively.
Figure 3B:
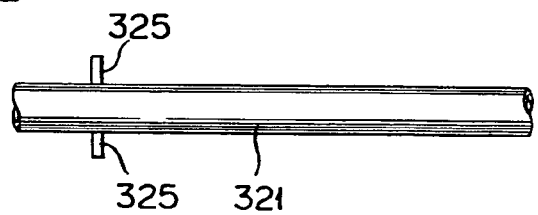
FIG. 3B is a front view.
Figure 3E:
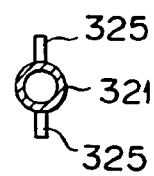
FIG. 3E is a side view, wherein a slightly shorter plate material than the inner diameter of the reaction or protective tube is used, respectively.
Figure 3C:
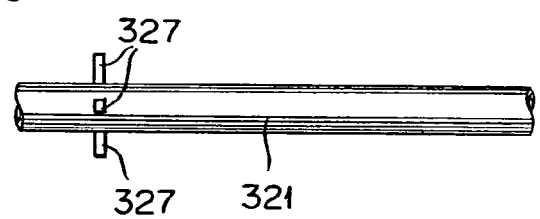
FIG. 3C is a front view.
Figure 3F:
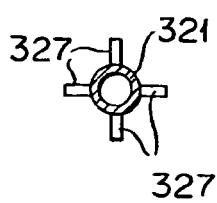
FIG. 3F is a side view, wherein a slightly shorter cross-plate material than the inner diameter of the reaction or protective tube is used, respectively.
Figure 4A:
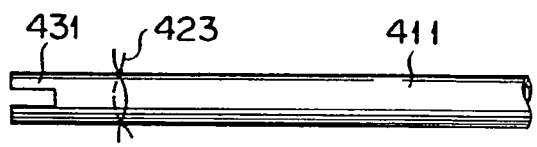
FIG. 4 is a summarized figure wherein swing-preventing means are equipped with the pressure protective tubes.
FIG. 4B is a front view wherein a wire is used as the swing-preventing means, and the protective tube's tip has a notch shape.
Figure 4B:
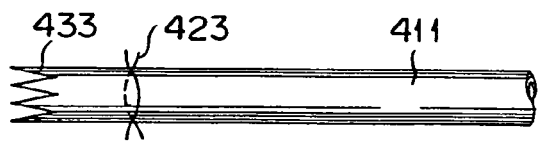

FIG. 4 are views showing swing-preventing means attached to the protective tube for a pressure measuring device; FIG. 4A is a front view of a wire as the swing-preventing means, attached to the protective tube, the tip thereof being a slit, and FIG. 4B is a front view of a wire as the swing-preventing means, attached to the protective tube, the tip thereof being a notch. As shown in FIG. 4, a slit 431 or notch 433 is preferably attached to the tip of protective tubes 411 to which the swing-preventing means 423 is attached. The shape is not restricted unless the solid particles block the protective tube. The attaching method of the swing-preventing means to the protective tube is repeated as the same method as shown in FIG. 3A.

The pressure measuring device can be attached in the similar way as the thermometer. The pressure measuring devices 123, 223 are set at the tip of the protective tube as shown in FIGS. 1 and 2 to measure the pressure of the solid particle layer.

The method for producing (meth)acrylic acid and/or (meth)acrolein is performed by means of the present reactor.

Now, the present production method is explained by means of the reactor wherein the shell is divided into two through a tube sheet to form two chambers, and a heat medium is circulated through the chamber independently. However, the present invention is not restricted to this preferred embodiment.

The shell in the reactor has two chambers A and B divided through an intermediate tube sheet as shown in FIGS. 1 and 2. A number of reaction tubes, including the measuring reaction tubes, are installed in the interior of a reaction chamber which has a circular cross section in horizontal. These reaction tubes are fastened at their upper ends to an upper tube sheet (FIG. 1) and at their lower ends to a lower tube sheet (FIG. 2) by a known method such as pipe expansion and/or welding technique. The shell of the reactor is horizontally partitioned with an intermediate tube sheet positioned substantially in the middle between the upper tube sheet and the lower tube sheet to form two chambers A (the upper side of the reactor) and B (the lower side of the reactor). Further, the reactor is preferably provided in the central part thereof with a pathway for advancing the heat medium upward from below without installation of the reaction tubes with a view to ensuring efficient transfer of the heat medium even in the central part.

The reaction tubes and the intermediate tube sheet are preferably made of the same material such as steel or iron in consideration of the possible expansion and contraction by heating and cooling.

In chambers A and B, donut, disc, and donut type baffle plates, for example, are alternately disposed so as to disperse the heat medium in the lateral direction and reduce the temperature distribution in the lateral direction.

The reaction tubes may be packed with a catalyst for the purpose of a reaction and enabled to utilize the catalyst as a fixed bed. In the production of acrylic acid by the reaction of two-step gas-phase catalytic oxidation of a propylene-containing gas, for example, oxidation catalysts generally used for producing acrolein by the reaction of gas-phase oxidation of a raw material gas containing propylene can be used as an upstream catalyst. A downstream catalyst is not particularly restricted, but may include, for example, oxidation catalysts generally used for producing acrylic acid by the gas-phase oxidation of a reaction gas mainly containing the acrolein obtained on the upstream by the method for two-step gas-phase catalytic oxidation.

The catalysts which form the upstream and downstream catalyst beds each do not need to be a unique catalyst. For example, several kinds of catalysts differing in activity may be sequentially packed or such catalysts, when necessary, may be diluted with an inert material such as an inert carrier. This fact holds true with other catalysts, which will be specifically described herein below.

Before the reaction tubes are packed with a catalyst, a metallic net or support plate is set at the bottom of the reaction tubes for preventing the catalyst from falling down. Before the catalyst is set, the reaction tubes, when necessary, are packed with a refractory substance inert to the reaction and then packed with the upstream catalyst. Then, they are packed with the downstream catalyst. An inert refractory substance or inert particle may be interposed between the upstream and downstream catalysts.

On the lower part of chamber B, may be filled an inert refractory substance to form a first inert particle layer, filled an upstream catalyst on the first inert particle layer to form an upstream catalyst particle layer, filled an inert refractory substance from the upper part of the upstream catalyst through the intermediate tube sheet to the entrance portion of chamber A to form a second inert particle layer, and then filled a downstream catalyst deposited in the remaining region of chamber A to form a downstream catalyst particle layer.

When the temperature of chamber B is higher than that of chamber A, for example, the raw material gas is partially oxidized by the upstream catalyst, then cooled in the portion of the second inert refractory substance, and thereafter partially oxidized further while maintaining the lowered temperature in the portion of the downstream catalyst to give a desired product. In the region of chamber A, the portion of the second inert refractory substance corresponds to a cooling layer and the portion of the downstream catalyst corresponds to a reaction layer. This is because when polymerizable gases produced by the oxidation in the downstream catalyst layer kept at a high temperature are led to the downstream catalyst layer, the yield of acrylic acid tends to reduce.

The whole layer of the second inert refractory substance is preferably packed substantially uniformly for the purpose of effectively cooling the reaction gas and of starting the reaction at the same place on the downstream catalyst layer in the whole reaction tube. This can be achieved by constantly filling the solid particles into all reaction tubes.

One of the functions of the second inert refractory substance layer resides, when the temperature of chamber A is lower than that of chamber B, in adjusting the temperature of the reaction gas to a level in a range proper for the oxidation reaction in the downstream catalyst layer by suddenly cooling the product-containing gas emanating from the upstream catalyst. The second inert refractory substance layer is required to dispose in a length enough for the function to be satisfactorily manifested.

In this invention, the second inert refractory substances is disposed in a length sufficient for cooling the reaction gas from the upstream catalyst layer to a temperature proper for the downstream catalyst layer and in a manner such that the catalyst in the outlet part of the upstream catalyst layer and the catalyst in the inlet part of the downstream catalyst layer are both incapable of substantially receiving to the heat influence from the intermediate tube sheet. The shell may be divided into three chambers if necessary, the intermediate chamber used as the inert particle layer, and a cooling medium circulated through the intermediate chamber.

The second inert refractory substance layer is only required to have a length sufficient for cooling the reaction gas entering the downstream catalyst layer from the second inert refractory substance layer, namely the reaction gas in the inlet part to the downstream catalyst layer, to a temperature of not more than the inlet temperature of the heat medium plus 15° C., when the heat medium is advanced in co-current flow to the raw material or produced gas.

Another function of the second inert refractory substance layer, through which the reaction gas emanating from the upstream reaction layer passes, resides not only in preventing the substances contained in the reaction gas, i.e. the molybdenum component sublimed from the upstream catalyst and high boiling substances such as terephthalic acid by-produced in the production of acrylic acid, for example, from causing pressure drop but also in preventing these defiling substances from directly entering the downstream catalyst layer and degrading the catalytic property thereof. For the sole sake of this function, it suffices to reduce the void ratio of the second inert refractory substance layer. If this reduction is unduly large, the excess will be at a disadvantage in aggravating the pressure drop. This invention may set the void ratio of the second inert refractory substance at a level in the range of 40-99.5%, preferably 45-99%. The term "void ratio" used herein is defined by the formula:

$$\text{Void ratio (\%)} = \{(X-Y)/X\} \times 100$$

wherein X denotes the volume of the second inert refractory substance layer and Y the real volume of the second inert refractory substance layer (the term "real volume" means, in the case of a ring, for example, the actual volume minus the central empty part).

If the void ratio is less than 40%, the shortage will enlarge the pressure drop. Conversely, if it exceeds 99.5%, the excess will be at disadvantages in lowering the function of capturing the impurities and degrading the function of cooling the reaction gas by the second inert particle layer as well.

When the first inert refractory substance layer is inserted in the inlet part to the upstream catalyst for the purpose of preheating the raw material gas, it brings the advantage of increasing the yield of desired products.

The raw material gas for a reaction is supplied up-flow to the reactor, exposed therein to the catalyst and allowed to give birth to the desired product, and discharged from the reactor through the upper part thereof. A method for supplying the reaction gas, when necessary, may be varied by altering the sequence of filling the kinds of catalyst so as to supply the reaction gas to the reactor down-flow.

In chamber A, the heat medium discharged through a heat medium outlet port of an annular conduit which is disposed on the outer periphery of the shell and provided with a plurality of openings communicating with the reactor is cooled by a heat exchanger. The cooled heat medium is then introduced into chamber A through an annular conduit which is disposed on the outer periphery of the shell and provided with a plurality of openings communicating with the reactor via a heat medium inlet with a known pump such as a volute or axial-flow pump. In the reactor, the heat medium enters the shell from the substantially whole circumference of the peripheral part of the reactor, contacts a bundle of reaction tubes and meanwhile recovers the heat generated when the reaction is exothermic, advances toward the center of the reactor, and ascends the hole formed in the donut type baffle plate. The heat medium further advances substantially horizontally along a disc type baffle plate to contact the bundle of reaction tubes and meantime recovers the reaction heat, advances toward the substantially whole peripheral part of the reactor, and ascends the outer peripheral part of the disc. Thereafter, the heat medium, by repeating this process, advances to the annular conduit disposed on the outer periphery of the reactor. Though a gap may interpose between the donut type baffle plates and the reactor, it is commendable to eliminate this gap for the purpose of reducing the temperature distribution of the heat medium in the reactor.

In chamber B, the heat medium circulates similarly in chamber A. Then, the method for circulating the heat medium, when necessary, allows the heat medium to be circulated in the reverse direction in either or both chambers A and B. From the viewpoint of protecting the pumps, the heat medium is preferred to pass the pumps after it has passed the heat exchangers and has then acquired a relatively low temperature.

As the heat medium to be used in the present invention, it may include the conventional one depending on the purpose to be used, but for example a molten salt generally used, niter, phenyl ether as an organic heat medium of Dowtherm.

In the production of acrylic acid by the reaction of two-step gas-phase catalytic oxidation of a propylene-containing gas according to this invention, an oxidation catalyst generally used for producing acrolein by subjecting a propylene-containing raw material gas to a reaction of gas-phase oxidation can be used as the upstream catalyst. Similarly, the downstream catalyst is not particularly restricted, but may include, for example, an oxidation catalyst generally used in producing acrylic acid by the gas-phase oxidation of a reaction gas which mainly contains the acrolein obtained in the former step by the method of two-step gas-phase catalytic oxidation.

Suitable examples of the upstream catalyst may include catalysts represented by the formula, $Mo_a$—$Bi_b$—$Fe_c$-$A_d$-$B_e$-$C_f$-$D_g$-$O_x$, wherein Mo, Bi, and Fe respectively denote molybdenum, bismuth, and iron, A denotes at least one element selected from the group consisting of nickel and cobalt, B denotes at least one element selected from the group consisting of alkali metals and thallium, C denotes at least one element selected from the group consisting of phosphorus, niobium, manganese, cerium, tellurium, tungsten, antimony, and lead, D denotes at least one element selected from the group consisting of silicon, aluminum, zirconium, and titanium, and O denotes oxygen, a, b, c, d, e, f, g, and x respectively denote the atomic ratios of Mo, Bi, Fe, A, B, C, D, and O satisfying the ranges, b=0.1-10, c=0.1-10, d=2-20, e=0.001-5, f=0-5, and g=0-30, on the basis of a=12, and x denotes the numerical value fixed by the states of oxidation of the relevant elements.

Suitable examples of the downstream catalyst may include catalysts represented by the formula, $Mo_a$—$V_b$—$W_c$—$Cu_d$-$A_e$-$B_f$-$C_g$-$O_x$, wherein Mo denotes molybdenum, V vanadium, W tungsten, Cu copper, A at least one element selected from the group consisting of antimony, bismuth, tin, niobium, cobalt, iron, nickel, and chromium, B at least one element selected from the group consisting of alkali metals, alkaline earth metals, and thallium, C at least one element selected from the group consisting of silicon, aluminum, zirconium, and cerium, and O denotes oxygen, a, b, c, d, e, f, g, and x respectively denote the atomic ratios of Mo, V, W, Cu, A, B, C, and O satisfying the ranges, b=2-14, c=0-12, d=0.1-5, e=0-5, f=0-5, and g=0-20, on the basis of a=12, and x denotes the numerical value fixed by the states of oxidation of the relevant elements.

As the catalyst to be used in producing methacrylic acid by the reaction of two-step gas-phase catalytic oxidation of isobutylene, t-butanol, or methyl-t-butyl ether according to this invention, an oxidation catalyst generally used as the upstream catalyst in producing methacrolein by the reaction of gas-phase oxidation of a raw material gas containing isobutylene, for example, can be used. The downstream catalyst is not particular restricted, but may include an oxidation catalyst generally used in producing methacrylic acid by the gas-phase oxidation of a reaction gas mainly containing the methacrolein obtained by the former step of the method for two-step gas-phase catalytic oxidation.

Suitable examples of the upstream catalyst may include catalysts of the formula, $Mo_a$—$W_b$—$Bi_c$—$Fe_d$-$A_e$-$B_f$-$C_g$-$D_h$-$O_x$, wherein Mo, W, and Bi respectively denote molybdenum, tungsten, and bismuth, Fe denotes iron, A denotes nickel and/or cobalt, B denotes at least one element selected from the group consisting of alkali metals, alkaline earth metals, and thallium, C denotes at least one element selected from the group consisting of phosphorus, tellurium, antimony, tin, cerium, lead, niobium, manganese, and zinc, D denotes at least one element selected from the group consisting of silicon, aluminum, titanium, and zirconium, and O denotes oxygen, a, b, c, d, e, f, g, h, and x respectively denote the atomic ratios of Mo, W, Bi, Fe, A, B, C, D, and O satisfying the ranges, b=0-10, c=0.1-10, d=0.1-20, e=2-20, f=0.001-10, g=0-4, and h=0-30 on the basis of a=12, and x denotes the numerical value fixed by the states of oxidation of the relevant elements.

The downstream catalyst is not particularly restricted but may comprise at least one oxide catalyst containing molybdenum and phosphorus as main components. For example, phosphomolybdic acid type heteropoly acids and metal salts thereof prove advantageous. Suitable examples of the downstream catalyst may include catalysts of the formula, $Mo_a$—$P_b$-$A_c$-$B_d$-$C_e$-$D_f$-$O_x$, wherein Mo denotes molybdenum, P denotes phosphorus, A denotes at least one element selected from the group consisting of arsenic, antimony, germanium, bismuth, zirconium, and selenium, B denotes at least one element selected from the group consisting of copper, iron, chromium, nickel, manganese, cobalt, tin, silver, zinc, palladium, rhodium, and tellurium, C denotes at least one element selected from the group consisting of vanadium, tungsten, and niobium, D denotes at least one element selected from the group consisting of alkali metals, alkaline earth metals, and thallium, and O denotes oxygen, a, b, c, d, e, f, and x respectively denote the atomic ratios of Mo, P, A, B, C, D, and O satisfying the ranges, b=0.5-4, c=0-5, d=0-3, e=0-4, and f=0.01-4 on the basis of a=12, and x denotes the numerical value fixed by the states of oxidation of the relevant elements.

Conditions for the reaction of a gas-phase catalytic oxidation of propylene or isobutylene with a molecular oxygen may be set by a known method. In the case of propylene, for example, the propylene concentration in the raw material gas is in the range of 3-15 vol. %, the ratio of molecular oxygen to the propylene in the range of 1-3, and the remainder comprises nitrogen, steam, carbon oxides, propane, etc.

Air is advantageously used as the feed source for the molecular oxygen. An oxygen-enriched air and pure oxygen, when necessary, may be used instead. The supply of such source for the molecular oxygen is implemented by the one-pass or recycling method. Preferably, the reaction temperature is in the range of 250° C.-450° C., the reaction pressure in the range of normal pressure to 5 atmospheres, and the space velocity in the range of 500-3000 $h^{-1}$ (STP).

Then, the production of acrylic acid is performed by packing the bundled reaction tubes in the shell reactor of the heat exchanger type second shell-and-tube reactor with the oxidation catalyst (downstream catalyst), feeding into the reactor the mixed gas prepared by adding secondary air, secondary oxygen, or steam, when necessary, to the acrolein-containing gas obtained by the former-step reaction at a reaction temperature (the temperature of the catalyst in the reactor) of 100° C.-380° C., preferably 150° C.-350° C., at a space velocity of 300-5,000 $hr^{-1}$ (STP), and performing the latter-step reaction.

Still more, in the case of two sequential reactors for producing acrylic acid, secondary air, secondary oxygen or steam if necessary may be additionally added between the first reactor and second reactor, acrolein being mainly produced in the first reactor and acrylic acid being mainly produced in the second reactor. Reaction conditions of the second reactor may be the similar to those of chamber B.

In the case of gas-phase catalytic oxidation of isobutylene, the isobutylene concentration in the raw material gas is in the range of 1-10 vol. %, the concentration of molecular oxygen 3-20 vol. % and the concentration of steam 0-60 vol. % respectively relative to isobutylene, and the remainder comprises nitrogen, steam, carbon oxides, etc. Air is advantageously used as the feed source for the molecular oxygen. An oxygen-enriched air and pure oxygen, when necessary, are also usable. Preferably, the reaction temperature is in the range of 250° C.-450° C., the reaction pressure in the range of normal pressure to five atmospheres, and the space velocity in the range of 300-5000 $h^{-1}$ (STP).

The production of methacrylic acid is performed by packing the bundled reaction tubes in the shell reactor of the heat exchanger type second shell-and-tube reactor with the oxidation catalyst (downstream catalyst) containing molybdenum and phosphorus, feeding into the reactor the mixed gas prepared by adding secondary air, secondary oxygen, or steam, when necessary, to the methacrolein-containing gas obtained by the former-step reaction at a reaction temperature (the temperature of the catalyst in the reactor) of 100° C.-380° C., preferably 150° C.-350° C., at a space velocity of 300-5,000 $hr^{-1}$ (STP), and carrying out the latter-step reaction.

Still more, in the case of two sequential reactors for producing methacrylic acid, secondary air, secondary oxygen or steam if necessary may be additionally added between the first reactor and second reactor, methacrolein being mainly produced in the first reactor and methacrylic acid being mainly produced in the second reactor. Reaction conditions of the second reactor may be the similar to those of chamber B.

The reactor constructed as described above is suitable for the production, by the reaction of gas-phase catalytic oxidation, of acrolein from propylene; methacrolein from at least one member selected from the group consisting of isobutylene, t-butanol, and methyl-t-butyl ether; maleic anhydride from benzene; maleic anhydride from butane; phthalic anhydride from xylene and/or naphthalene; acrylic acid from acrolein; and methacrylic acid from methacrolein, particularly for the production of (meth)acrolein from (meth)acrylic acid and/or (meth)acrolein.

EXAMPLE

The present invention will be explained with reference to the following examples, but not restricted by the following examples.

Referential Example 1

Production of Upstream Catalyst

In 150 liters of purified water kept heated and stirred, 100 kg of ammonium molybdate, 6.3 kg of ammonium paratungstate, and 13.7 kg of nickel nitrate were dissolved. To the resultant solution, an aqueous nitrate solution prepared by mixing a solution of 68.7 kg of cobalt nitrate in 100 liters of purified water, a solution of 19 kg of ferric nitrate in 30 liters of purified water, and a solution of 27.5 kg of bismuth nitrate in 30 liters of purified water incorporating therein 6 liters of concentrated nitric acid was added dropwise. Then, a solution of 14.2 kg of an aqueous 20 wt. % silica sol solution and 0.29 kg of potassium nitrate in 15 liters of purified water was added. The suspension thus obtained was heated and stirred till vaporization to dryness and then dried and pulverized. The produced powder was molded into cylinders 5 mm±10% in diameter and 7 mm±10% in length and calcined as swept with air at 460° C. for six hours to afford a catalyst. The produced catalyst had this molar composition: Mo 12, Bi 1, Fe 1, Co 5, Ni 1, W 0.5, Si 1, and K 0.06.

Referential Example 2

Production of Downstream Catalyst

In 500 liters of purified water kept heated and stirred, 100 kg of ammonium molybdate, 12.7 kg of ammonium paratungstate, and 27.6 kg of ammonium metavanadate were dissolved. To the resultant solution, a solution of 20.5 kg of copper nitrate and 1.4 kg of antimony trioxide in 50 liters of purified water were added. This mixed solution and 350 kg of a silica-alumina carrier having an average particle diameter of 5 mm±10% were evaporated together to dryness to have a catalytic component deposited on the carrier and then calcined at 400° C. for six hours to afford a catalyst. The catalyst in a required amount was obtained by repeating this process. This catalyst had this molar composition: Mo 12, V 5.0, W 1.0, Cu 2.2, Sb 0.2.

Inert Particle

Raschig rings of stainless steel having 6 mm±0.5 mm in outer diameter, and 6 mm±0.5 mm in length (available from IWAO JIKI K.K. in Japan) are used as the inert particle.

Example 1

A vertical shell-and-tube reactor was adopted, having reaction tubes made of steel and of 6,500 mm in length and 25 mm in inside diameter, with an intermediate tube sheet equipped at the middle of the reactor. Upstream catalyst particles, inert particles, and downstream catalyst particles were sequentially filled on the bottom of reaction tubes per each reaction tube as follows:

Filling Manner

The upstream catalyst, inert, and downstream catalyst particles were divided into 14 pieces so as to be the same volume, respectively.

All of non-measuring reaction tubes were filled with the above particles, and then measuring reaction tubes filled therewith in a way that the length of filled layer was the same as the mean of the non-measuring reaction tubes. The volumetric measurement was performed by means of a plastic volumetric measuring vessel. The length of the layer was performed with a measure. The pressure drop of the solid particle layer was measured on a differential pressure gage.

Reaction Tube Nos. 1-3:

One of the divided upstream catalyst particles per reaction tube was filled into the reaction tube, respectively. The filled layer was measured in length, and pressure drop for the filled reaction tube was measured while passing air through the tube at a rate of 15 N liter/min.

Reaction Tube No. 4:

A thermometer of 1 mm in outer diameter with a swing-preventing means as shown in FIG. 3A was inserted and stopped at 800 mm from the bottom of the reaction tube (here, the thermometer means the detector in the tip thereof.).

Then, one of the divided catalyst particles was filled into the reaction tube for a slight longer time than the mean of the filling time for the reaction tube Nos. 1-3 so as to coincide with the mean length of the reaction tube Nos. 1 to 3. The filling result is as summarized in Table 1 below. The value for pressure drops was the same as the mean value for the reaction tube Nos. 1-3.

Reaction:

The synthesis reaction of acrylic acid from propylene was performed for the reaction tube Nos. 1 to 4, respectively. The raw material gas contains 7.0 vol. % of propylene, 12.6 vol. % of oxygen, 10.0 vol. % of steam, and 70.4 vol. % of nitrogen. The raw material gas was set at a SV (space velocity) of 1,600 $hr^{-1}$ against the upper catalyst layer. The temperature of the upstream catalyst layer (the inlet temperature of heat medium for the reactor) was maintained at 315° C., and the temperature of the downstream catalyst layer (the inlet temperature of the heat medium for the reactor) maintained at 275° C.

The test results are shown in Table 1 below. In Table 1, the conversion and selectivity to acrylic acid for the reaction tube No. 4 was almost equal to those for the reaction tube Nos. 1-3. The temperature for the upstream catalyst layer was measured.

Example 2

A protective tube of 4 mm in outer diameter, 3 mm in inside diameter and 2,900 mm in length from the bottom of the reaction tubes, with a swing-preventing means was inserted into a reaction tube No. 5 from the bottom side, and then a thermometer of 1 mm in outer diameter inserted into the protective tube.

Then, one of the divided catalyst particles was filled into the reaction tube No. 5 thus obtained for a far longer time than the mean of the filling time for the reaction tube Nos. 1-3 so as to coincide with the mean pressure drop of the reaction tube Nos. 1 to 3.

The reaction procedure was repeated in the same manner as in Example 1, and test results are shown in Table 1 below. In Table 1, the reaction results and the temperature of the catalyst layer were almost same as those of Example 1.

Comparative Example 1

The procedure of Example 2 was repeated, except that the filling time of the upstream catalyst particles into a reaction tube No. 6 is shorter than the mean of the filling time for the reaction tube Nos. 1-3, and the control of pressure drop for the reaction tube No. 6 was not performed. Test results are shown in Table 1 below.

The values of the pressure drop, the temperature of the catalyst particle layer, the conversion of propylene, selectivity to acrylic acid of the reaction tube No. 6 were lower than those of Example 2, respectively.

Example 3

The procedure of Example 2 was repeated, except that in a reaction tube No. 7, a protective tube of 10 mm in outer diameter and 9 mm in inside diameter was used, and the filling time is longer than that of Example 2. Test results are shown in Table 1 below.

As shown in Table 1, the values of the pressure drop, reaction results and the temperature of the catalyst particle layer were almost equal to those of Example 2, respectively.

Comparative Example 2

The procedure of Example 2 was repeated, except that in a reaction tube No. 8, a protective tube of 12 mm in outer diameter and 11 mm in inside diameter was used, and the filing time of the upstream catalyst particles was longer than the mean value of those of the reaction tube Nos. 1-3. Test results are shown in Table 1 below.

In Table 1, the values of the pressure drop, the temperature of the catalyst particle layer, propylene conversion, and selectivity to acrylic acid were lower than those of Example 2, respectively.

Example 4

The procedure of Example 2 was repeated, except that a protective tube without a swing-preventing means was inserted into a reaction tube No. 9. Test results are shown in Table 1 below.

In Table 1, the values of the pressure drop, propylene conversion, and selectivity to acrylic acid were almost equal to those of Example 2, respectively, and the temperature of the catalyst particle layer was lower than those of Example 2, respectively.

Example 5

The procedure of Example 1 in the reaction tube No. 4 was repeated, except that a thermometer of 1 mm in outer diameter with a swing-preventing means was inserted from the upper side, and stopped at 2,200 mm from the upper ends of the reaction tubes. Test results are shown in Table 1 below.

In Table 1, the values of the pressure drop, propylene conversion, selectivity to acrylic acid were almost equal to those of Example 1 in the reaction tube No. 4, respectively. The temperature of the downstream catalyst layer could be measured.

Example 6

The procedure of Example 5 was repeated, except that a protective tube of 4 mm in outer diameter, 3 mm in inside diameter and 3,000 mm in length from the upper ends of the reaction tubes, with a swing-preventing means was inserted into a reaction tube No. 11 from the upper side, a thermometer of 1 mm in outer diameter inserted into the protective tube, and the filling time of the downstream catalyst particles was longer than that of Example 5. Test results are shown in Table 1 below.

In Table 1, the values of the reaction results and catalyst particle layer temperature were almost equal to those of Example 5, respectively.

Comparative Example 3

The procedure of Example 6 was repeated, except that the filling time of the downstream catalyst particles in a reaction tube No. 12 was shorter. Test results are shown in Table 1 below.

In Table 1, the values of the pressure drop, catalyst particle temperature, propylene conversion and selectivity to acrylic acid were lower than those of Example 5, respectively.

Example 7

The procedure of Example 6 was repeated, except that the outer diameter of the protective tube was changed to 10 mm, the inside diameter thereof to 9 mm, the filling time of the downstream catalyst particles was longer, and a reaction tube No. 13 was used. Test results are shown in Table 1 below.

In Table 1, the values of the pressure drop, reaction results, and catalyst particle layer temperature were almost equal to those of Example 5, respectively.

Comparative Example 4

The procedure of Example 6 was repeated, except that the outer diameter of the protective tube was changed to 12 mm, the inside diameter thereof to 11 mm, the filling time of the downstream catalyst particles was longer, and a reaction tube No. 14 was used. Test results are shown in Table 1 below.

In Table 1, the values of the pressure drop, catalyst particle layer temperature, propylene conversion and selectivity to acrylic acid were lower than those of Example 5, respectively.

TABLE 1

|  |  | Ex. 1 | | | | Ex. 2 | C. Ex. 1 | Ex. 3 | |
| --- | --- | --- | --- | --- | --- | --- | --- | --- | --- |
| Reaction tube No. | | 1 | 2 | 3 | 1-3 mean | 4 | 5 | 6 | 7 |
| I. d. (mm) | | 25 | 25 | 25 | | 25 | 25 | 25 | 25 |
| Thermometer | | non | non | non | | | | | |
| Protective tube | | | | | | non | with | with | with |
| Swing-prevent | | | | | | with | with | with | with |
| L (mm) | | | | | | | LP-2900 | LP-2900 | LP-2900 |
| O. d. (mm) | | | | | | 1 | 4 | 4 | 10 |
| Position (mm) | | | | | | LP-800 | LP-800 | LP-800 | LP-800 |
| Filling | | | | | | | | | |
| F. time | UC (s) | 92 | 88 | 93 | 91 | 102 | 572 | 78 | 883 |
| | IS (s) | 25 | 27 | 23 | 25 | 26 | 28 | 25 | 26 |
| | DC (s) | 61 | 55 | 57 | 58 | 60 | 63 | 56 | 62 |
| LL | UC (mm) | 2905 | 2910 | 2895 | 2903 | 2903 | 2903 | 2903 | 2903 |
| | IS (mm) | 555 | 555 | 560 | 557 | 557 | 557 | 557 | 557 |
| | DC (mm) | 2500 | 2515 | 2510 | 2508 | 2508 | 2508 | 2508 | 2508 |
| PD | UC (kPa) | 2.90 | 2.85 | 2.94 | 2.90 | 2.88 | 2.81 | 2.28 | 2.75 |
| | Total (kPa) | 5.55 | 5.42 | 5.47 | 5.48 | 5.48 | 5.32 | 4.83 | 5.31 |
| Reaction results | | | | | | | | | |
| URT (° C.) | | 315 | 315 | 315 | 315 | 315 | 315 | 315 | 315 |
| DRT (° C.) | | 275 | 275 | 275 | 275 | 275 | 275 | 275 | 275 |
| UCLT (° C.) | | | | | | 357 | 355 | 343 | 353 |
| DCLT (° C.) | | | | | | | | | |
| PC (%) | | 97.5 | 97.3 | 97.2 | | 97.3 | 97.4 | 96.7 | 97.2 |
| STA (%) | | 90.5 | 90.6 | 90.2 | | 90.4 | 90.4 | 89.7 | 90.3 |

|  | C. Ex. 2 | Ex. 4 | Ex. 5 | Ex. 6 | C. Ex. 3 | Ex. 7 | C. Ex. 4 |
| --- | --- | --- | --- | --- | --- | --- | --- |
| Reaction tube No. | 8 | 9 | 10 | 11 | 12 | 13 | 14 |
| I. d. (mm) | 25 | 25 | 25 | 25 | 25 | 25 | 25 |

TABLE 1-continued

| | | | | | | | | |
|---|---|---|---|---|---|---|---|---|
| Thermometer | | | | | | | | |
| Protective tube | | with | with | non | with | with | with | with |
| Swing-prevent | | with | non | with | with | with | with | with |
| L (mm) | | LP-2900 | LP-2900 | | UP-3000 | UP-3000 | UP-3000 | UP-3000 |
| O. d. (mm) | | 12 | 4 | 1 | 4 | 4 | 10 | 12 |
| Position (mm) | | LP-800 | LP-800 | UP-2200 | UP-2200 | UP-2200 | UP-2200 | UP-2200 |
| Filling | | | | | | | | |
| F. time | UC (s) | 1320 | 558 | 91 | 88 | 94 | 92 | 89 |
| | IS (s) | 25 | 27 | 26 | 23 | 25 | 26 | 26 |
| | DC (s) | 59 | 61 | 68 | 427 | 55 | 568 | 924 |
| LL | UC (mm) | 2903 | 2903 | 2903 | 2903 | 2903 | 2903 | 2903 |
| | IS (mm) | 557 | 557 | 557 | 557 | 557 | 557 | 557 |
| | DC (mm) | 2508 | 2508 | 2508 | 2508 | 2508 | 2508 | 2508 |
| PD | UC (kPa) | 2.13 | 2.75 | 2.95 | 2.83 | 2.88 | 2.92 | 2.89 |
| | Total (kPa) | 4.72 | 5.38 | 5.61 | 5.33 | 4.78 | 5.27 | 4.68 |
| Reaction results | | | | | | | | |
| URT (° C.) | | 315 | 315 | 315 | 315 | 315 | 315 | 315 |
| DRT (° C.) | | 275 | 275 | 275 | 275 | 275 | 275 | 275 |
| UCLT (° C.) | | 340 | 342 | | | | | |
| DCLT (° C.) | | | | 312 | 310 | 301 | 308 | 298 |
| PC (%) | | 96.5 | 97.3 | 97.4 | 97.3 | 97.3 | 97.5 | 97.3 |
| STA (%) | | 89.3 | 90.5 | 90.4 | 90.2 | 88.7 | 90.1 | 88.3 | wherein
Ex.: Example
C. Ex.: Comparative Example
LP: Lower Part
UP: Upper Part
I. d.: Inside diameter for protective tubes
Swing-prevent: Swing-preventing means
L: Length of protective tubes
O. d.: Outside diameter
Position: Measuring position
F. time: Filling time
LL: layer length
PD: Pressure drop
UC: Upstream Catalyst
DC: Downstream Catalyst
IS: Inert Substance
URT: Upstream Reaction Temperature
DRT: Downstream Reaction Temperature
UCLT: Upstream Catalyst Layer Temperature
DCLT: Downstream Catalyst Layer Temperature
PC: Propylene Conversion
STA: Selectivity to Acrylic Acid It is clear from Table 1 that the reaction in the measuring reaction tubes could be achieved as the same reaction as the reaction in the non-measuring reaction tubes, and the catalyst particle layer temperature could be measured.

In accordance with the present invention, the temperature and pressure profiles in the measuring reaction tubes can be the same as those in the non-measuring reaction tubes, and thus at least one of the measuring reaction tubes can be the representative in the all reaction tubes in measuring the temperature of solid particle layers.

Reaction efficiency in the measuring reaction tubes can be the same as that in the non-measuring reaction tubes, thus the present invention is advantageous in that the raw material conversion and selectivity to the objective products are high, productivity is excellent, and a certain nature can be ensured (see Examples in Table 1).

The present advantageous effects can be attained by using substantially the same solid particles without solid particles for controlling the pressure drop, and thus the present invention is advantageous in omitting labors or equipment for producing plural of solid particles different from particle diameters and shapes so as to control the pressure drop and for mixing these solid particles uniformly.

In the present invention, since the solid particles for controlling the pressure drop are not necessary, substantially the same solid particles, for example usually used, can be filled in reaction tubes with or without the thermometer. The usually used solid particles have accumulated many useful techniques and data, so that these can be effectively utilized. In contrast, to seek a suitable combination of particle diameters and shapes for controlling the pressure drop would not be simple by means of experiments.

Further, in the case of measuring the temperature of solid particle layers, in particular the hot spot, dispersion of measuring the temperatures can be suppressed stubbornly by equipping the thermometer with a swing-preventing means to position the thermometer at the axial center of the reaction tube inserted. Namely, it can exclude adversely effects about a horizontal plate vertical to the reaction tube axis from outer sides to the center portion on the plate. Even if the filled solid particles are withdrawn from the reaction tubes and newly ones are re-filled thereinto, the thermometer can be positioned in the prescribed position by employing the swing-preventing means. Accordingly, it can measure the temperatures of the solid particle layers more accurately (see in Table 1 Examples 1-3 vs. Example 4). As a result, it can more accurately expect the catalyst life by means of degradation with time or the like, thereby the time at which the filled solid particles are to be withdrawn and newly ones are to be refilled can be grasped precisely.

In the present invention, productions such as (meth)acrylic acid and/or (meth)acrolein can be effectively performed in a single reactor including upstream and downstream catalysts, since pressure controlling particles are not necessary. In contrast, when three types of upstream catalyst, inert, and downstream catalyst particles are inserted into a reaction tube, if particles for controlling the pressure drop are employed, and the respective particles for controlling the pressure drop for the above three types would be required to be mixed. After filling, the smaller particles for pressure controlling would drop into the lower layer, so that pressure control would be difficult. There is a fear that the pressure drop deviates during operation, and conversion of raw materials and selectivity to the product are lowered.

(Meth)acrylic acid and/or (meth)acrolein can be effectively produced employing the shell-and-tube reactor of the present invention.

In addition, employing a pressure measuring device would prove similar effects to the case of the thermometer.

The entire disclosure of Japanese Patent Application No. 2001-193137 filed on Jun. 26, 2001 including specification, claims, drawings and summary are incorporated herein by reference in its entirety.

What is claimed is:

1. A method for filling reaction tubes with solid particles, wherein the reaction tubes have different empty space volume, comprising the steps of:
    providing a reactor apparatus comprising a plurality of reaction tubes and at least one measuring means, wherein at least one reaction tube has said measuring means inside and at least one reaction tube is without measuring means inside; and
    filling solid particles into each of the reaction tubes over a period of time to form a solid particle layer that is substantially the same in each of the reaction tubes, wherein the period of time for filling or the filling speed is varied in a manner that achieves a filled length of the solid particle layer that is substantially the same in each of the reaction tubes and that achieves a pressure drop that is substantially the same in each of the reaction tubes.

2. The method of claim 1 wherein the filling of the solid particles into the at least one reaction tube without measuring means inside occurs at a speed in a range of 15 to 100 seconds per liter of the divided solid particles.

3. The method of claim 1 wherein the filling of the solid particles per liter into the at least one reaction tube with said measuring means is performed for a period of time of 1.0 to 50 times the filling of the solid particles per liter into the at least one reaction tube without the measuring means.

4. The method of claim 1 wherein the filling of solid particles per liter into the at least one reaction tube with said measuring means is performed for a period of time of 1.5 to 40 times the filling of the solid particles per liter into the at least one reaction tube without the measuring means.

5. The method of claim 1 wherein the measuring means measures temperature of the solid particle layer.

6. The method of claim 5 wherein the temperature measured in the at least one reaction tube that has said measuring means inside is representative of the temperature in the at least one reaction tube without measuring means inside.

7. The method of claim 1 wherein the solid particle layer comprises an upstream oxidation catalyst capable of catalyzing the production of (meth)acrolein and a downstream oxidation catalyst capable of catalyzing the production of (meth)acrylic acid; and the method further comprises passing a gas comprising at least one component selected from the group consisting of isobutylene, propylene, and propane through the reaction tubes whereby subsequent to passing through the upstream oxidation catalyst the gas comprises (meth)acrolein and subsequent to passing through the downstream oxidation catalyst the gas comprises (meth)acrylic acid.

8. The method of claim 7 wherein the solid particle layer comprises an upstream oxidation catalyst capable of catalyzing the production of acrolein and a downstream oxidation catalyst capable of catalyzing the production of acrylic acid; and the gas comprises at least one component selected from the group consisting of propylene and propane, whereby subsequent to passing through the upstream oxidation catalyst the gas comprises acrolein and subsequent to passing through the downstream oxidation catalyst the gas comprises acrylic acid.

9. A method for producing (meth)acrylic acid and/or (meth)acrolein by means of a two step gas-phase catalytic oxidation comprising:
    a) filling reaction tubes by the method of claim 1, wherein the solid particle layer comprises:
        i) an upstream oxidation catalyst capable of catalyzing the production of (meth)acrolein, and
        ii) a downstream oxidation catalyst capable of catalyzing the production of (meth)acrylic acid; and
    b) passing a gas comprising at least one component selected from the group consisting of isobutylene, t-butanol, methyl-t-butyl ether, propylene and propane through the reaction tubes whereby subsequent to passing through the upstream oxidation catalyst the gas comprises (meth)acrolein and subsequent to passing through the downstream oxidation catalyst the gas comprises (meth)acrylic acid.

10. A method for producing a shell-and-tube reactor, which comprises:
    preparing a plurality of reaction tubes, at least one reaction tube being a measuring reaction tube having measuring means inserted therein to measure temperature and/or pressure along the axis of the measuring reaction tube, the measuring means occupying a certain volume in the measuring reaction tube, and the remaining reaction tubes being non-measuring reaction tubes containing no measuring means;
    filling each of the non-measuring reaction tubes with solid particles to form a solid particle layer; and
    filling the measuring reaction tube with substantially the same solid particles as the non-measuring reaction tubes to form a solid particle layer using a slower filling speed than the non-measuring tubes, such that the length of the solid particle layer in each filled reaction tube is substantially the same and the pressure drop on passing a gas through each reaction tube is substantially the same.

11. The method of claim 10, wherein the measuring means measures the temperature of the solid particle layer.

12. The method of claim 10, wherein the temperature measured in the at least one measuring reaction tube is representative of the temperature in the non-measuring reaction tubes.

13. The method of claim 10, wherein the solid particle layer comprises at least one member selected from the group consisting of an oxidation catalyst for producing acrolein by subjecting a propylene-containing raw material gas to a reaction of gas-phase oxidation and an oxidation catalyst for producing acrylic acid by the gas-phase oxidation of a reaction gas which mainly contains acrolein.

14. The method of claim 10 wherein the solid particle layer comprises an oxidation catalyst for producing acrolein by subjecting a propylene-containing raw material gas to a reaction of gas-phase oxidation as the upstream catalyst and an oxidation catalyst for producing acrylic acid by the gas-phase oxidation of a reaction gas which mainly contains the acrolein obtained in the former step.

15. The method of claim 10 further comprising a swing-preventing means attached to the measuring means.

* * * * *